US012179936B2

(12) United States Patent
Auillans et al.

(10) Patent No.: US 12,179,936 B2
(45) Date of Patent: Dec. 31, 2024

(54) LANDING ZONE LANDING ASSISTANCE SYSTEM FOR A ROTARY WING AIRCRAFT

(71) Applicant: THALES, Courbevoie (FR)

(72) Inventors: Pierre-Jean Auillans, Merignac (FR); Audrey Aubignac, Merignac (FR); David Gazeau, Merignac (FR); Bernard Panefieu, Merignac (FR)

(73) Assignee: THALES, Courbevoie (FR)

( * ) Notice: Subject to any disclaimer, the term of this patent is extended or adjusted under 35 U.S.C. 154(b) by 212 days.

(21) Appl. No.: 17/968,696

(22) Filed: Oct. 18, 2022

(65) Prior Publication Data
US 2023/0117700 A1    Apr. 20, 2023

(30) Foreign Application Priority Data
Oct. 20, 2021  (FR) ........................... 2111147

(51) Int. Cl.
*B64C 39/02* (2023.01)
*B64C 27/04* (2006.01)
*B64D 45/08* (2006.01)
*G01S 13/933* (2020.01)
*G06T 7/73* (2017.01)

(52) U.S. Cl.
CPC .............. *B64D 45/08* (2013.01); *B64C 27/04* (2013.01); *B64C 39/024* (2013.01);
(Continued)

(58) Field of Classification Search
CPC ....... B64D 45/08; B64C 27/04; B64C 39/024; G01S 13/933; G01S 13/867;
(Continued)

(56) References Cited

U.S. PATENT DOCUMENTS

2017/0186330 A1* 6/2017 Monvoisin ............. G08G 5/025
2017/0217605 A1* 8/2017 Srivastav ............. G01S 13/935
(Continued)

FOREIGN PATENT DOCUMENTS

CN    113 359 782 A    9/2021
EP    3 866 136 A1     8/2021
(Continued)

OTHER PUBLICATIONS

Peinecke, "Detection of helicopter landing sites in unprepared terrain", Proceedings of the SPIE, vol. 9087, 2014.

*Primary Examiner* — Daniel M. Robert
(74) *Attorney, Agent, or Firm* — Baker Hostetler

(57) ABSTRACT

A landing zone landing assistance system for a rotary wing aircraft, the system includes a computer, an HMI for interacting with the pilot of the aircraft, an optical assembly provided with at least one optical sensor, a radar assembly provided with at least one radar detector and an inertial unit, wherein the computer is configured to implement the following steps: a first step (Step1) consisting in determining an optical image of the possible landing zone; a second step (Step2) consisting in determining the relative position of the landing zone with respect to said system in the terrestrial reference frame; a third step (Step3) consisting in determining a landing zone approach path; and a fourth step (Step4) consisting in supplying to the HMI a deviation between the position of the system and the approach path.

10 Claims, 11 Drawing Sheets

(52) U.S. Cl.
CPC .............. *G01S 13/933* (2020.01); *G06T 7/74* (2017.01); *G06T 2207/10032* (2013.01); *G06T 2207/30184* (2013.01)

(58) Field of Classification Search
CPC ..................... G01S 13/913; G06T 7/74; G06T 2207/10032; G06T 2207/30184; G08G 5/0021; G08G 5/0086; G08G 5/025; G05D 1/0676
See application file for complete search history.

(56) References Cited

U.S. PATENT DOCUMENTS

| | | | |
|---|---|---|---|
| 2018/0130363 A1* | 5/2018 | Yvetot | G01C 23/00 |
| 2018/0222602 A1 | 8/2018 | Salesse-Lavergne | |
| 2018/0224868 A1* | 8/2018 | Lim | G01S 13/882 |
| 2019/0003840 A1* | 1/2019 | Song | H04N 23/60 |
| 2019/0079509 A1* | 3/2019 | Bosworth | G05D 1/0044 |
| 2019/0291862 A1* | 9/2019 | Lyasoff | G05D 1/102 |
| 2020/0130864 A1* | 4/2020 | Brockers | B64F 1/007 |
| 2022/0041298 A1* | 2/2022 | Schurek | G08G 5/0086 |
| 2022/0127007 A1* | 4/2022 | Stribrny | B64D 25/08 |
| 2022/0234752 A1* | 7/2022 | Chen | G06V 20/64 |
| 2022/0258880 A1* | 8/2022 | George | G01S 13/865 |
| 2022/0397915 A1* | 12/2022 | Ortman | G08G 5/0021 |
| 2023/0117700 A1* | 4/2023 | Auillans | G01S 13/913 701/302 |

FOREIGN PATENT DOCUMENTS

| | | | |
|---|---|---|---|
| FR | 2 852 686 B1 | 8/2005 | |
| FR | 2 984 577 A1 | 6/2013 | |

* cited by examiner

LANDING ZONE LANDING ASSISTANCE SYSTEM FOR A ROTARY WING AIRCRAFT

CROSS-REFERENCE TO RELATED APPLICATION

This application claims priority to foreign French patent application No. FR 2111147, filed on Oct. 20, 2021, the disclosure of which is incorporated by reference in its entirety.

FIELD OF THE INVENTION

The invention relates to a landing zone landing assistance system for a rotary wing aircraft, such as a helicopter or a drone.

BACKGROUND

When visibility is poor, at night, or in the presence of fog, rain or dust, aircraft approaches are performed using instruments. On a prepared landing zone, an aircraft is guided using radio equipment on the ground and on board.

Such equipment makes it possible to guide the aircraft to its landing point with the right trajectory (direction and rate of descent) which guarantees safety.

The problem arises when an aircraft, like a helicopter or a drone, wants to land entirely autonomously, on a sketchy terrain that has not been able to be prepared by a team on the ground. Such is for example the case, for many military missions in operations abroad, or for civil protection helicopters which make their choice of landing zone only a few minutes before setting down.

In particular, when a rotary wing aircraft, such as a helicopter or a drone, lands in a dusty or sandy zone, on approaching the ground, the blast from the helicopter raises a cloud of dust which degrades the visibility of the pilot (brownout phenomenon). The so-called visual approach, which is very risky, is then compromised and sometimes creates accidents.

When the pilot of a rotary wing aircraft, such as a helicopter or a drone, has to land on an unprepared terrain, he or she applies an approach and take-off reasoning method, with the acronym MRAD, during which he or she decides:
 the precise point where he or she will set down his or her aircraft, hereinafter called landing zone,
 the approach axis given the wind and obstacles,
 the type of approach used: descent angle, presence or not of a final vertical descent, in or out of ground effect (DES, HES), and
 the motor power.

Ground effect is understood to be the aerodynamic flow at low height, created by the rotor of the rotary wing, modified by the proximity to the ground. The result thereof is that the power needed to create the lift is reduced.

Once these choices are defined, the pilot knows his or her theoretical approach trajectory, his or her descent angle, his or her theoretical speed to be applied, his or her possible stabilization point to finish in vertical descent. He or she must then apply these theoretical elements. To be referenced in space and apply the right slope, the pilot uses primarily his or her senses and experience by observing the outside. Even in a case of good visibility, he or she does not necessarily apply the right manoeuvres.

In the case of a dust cloud or screen, or "brown-out" case, i.e. in the case of restricted visibility in flight due to dust or sand in the air, the pilot loses visibility on his or her final approach trajectory. He or she may even be misled by sensory illusions. He or she tries to retain the right rotary wing aircraft situation, by seeking the few visual markers that he or she manages to distinguish. These markers help him or her to know the situation of the rotary wing aircraft (attitude, altitude).

For a helicopter, the co-pilot can assist the pilot by monitoring and by "singing out" the instruments (engine power, speed, altitude, etc.), so that the pilot at the controls can keep watching outside.

The problem is how to have an autonomous means for assisting in guidance to any landing zone (prepared or not), for a pilot who has lost the outside visibility, without the need for ground infrastructure, leaving him or her a totally free choice of landing zone, and offering him or her parameterizable optimum descent profiles.

Autonomous is understood to mean a processing of data from sensors and/or instruments intrinsic to the system embedded on the carrier, without recourse to external data received by the embedded system (such as GPS data, data transmitted by radio frequency, optical or other data).

Assisting the pilot in landing in any unprepared zone, whatever the visibility, and without depending on means external to the aircraft (such as, for example: GPS, ILS, etc.).

An unprepared zone is understood to be a zone not equipped with an infrastructure intended to assist an aircraft pilot in landing or in taking off.

The document FR2852686 B1 is for example known which relates to an aircraft piloting system, at least for piloting the aircraft in a non-precision approach with a view to a landing, and which describes a landing system using a GPS and an inertial unit.

It does not use data from embedded sensors such as a radar for example, but rather a radio beacon of VOR type, a range finder (DME) which require equipment on the ground.

In the case of military aircraft, the landing zones are not necessarily known in advance. The operatives then use several solutions. They can prepare the landing zone with landing-dedicated roving radio means. If they do not want to use means on the ground, and want to land when dust is present, the pilot can first fly over the zone where he or she wants to land, and, when the rotary wing aircraft is perfectly vertically above the landing zone, he or she stops. He or she then marks the geographic coordinates of this landing zone (records the GNSS position). Next, he or she moves away, does another turn to make the landing procedure using the automatic pilot, if so equipped.

SUMMARY OF THE INVENTION

One aim of the invention is to mitigate the problems cited previously, and notably to assist in the landing for a rotary wing aircraft.

According to one aspect of the invention, a landing zone landing assistance system is proposed for a rotary wing aircraft, such as a helicopter or a drone, the system comprising a computer, an HMI for interacting with the pilot of the aircraft, an optical assembly provided with at least one optical sensor, a radar assembly provided with at least one radar detector, and an inertial unit, wherein the computer is configured to implement the following steps:
 a first step consisting in determining an optical image of the possible landing zone based on data supplied by the optical assembly, representing the intersection of the field of the optical assembly and of the field of the radar assembly, and in transmitting this image to the HMI allowing the pilot to select a landing zone, on the possible landing zone reduced to said intersection;

a second step consisting in determining the relative position of the landing zone with respect to said system in the terrestrial reference frame, based on the landing zone supplied by the HMI selected by the pilot, in the possible landing zone, on data supplied by the inertial unit, on data supplied by the optical assembly, and on data supplied by the radar assembly;

a third step consisting in determining a landing zone approach path based on the relative position of the landing zone with respect to said system and on approach parameters supplied by the HMI on instructions from the pilot; and a fourth step consisting in supplying to the HMI a deviation between the position of the system and the approach path, based on data supplied by the inertial unit, on data supplied by the radar assembly, and on the relative position of the landing zone.

Terrestrial reference frame is understood to be a reference frame centred on the centre of mass of the Earth and whose three orthonormal axes OX, OY and OZ intersecting at the origin centre of mass of the reference frame are linked to the terrestrial globe.

In one embodiment, the computer is configured to implement the second step on the basis of:

data supplied by the radar assembly, comprising the distance, the azimuth and the elevation of the selected landing zone in the reference frame of the system; and data supplied by the inertial unit comprising the roll, yaw and pitch angles of the system defining the attitude of the system and its heading with respect to the terrestrial reference frame;

and configured to determine the relative position of the landing zone with respect to said system in the terrestrial reference frame by using a transition matrix determined on the basis of data supplied by the inertial unit.

According to one embodiment, the computer is configured to implement the third step based on:

the relative position of the landing zone with respect to said system in the terrestrial reference frame; and approach parameters supplied by the HMI on instructions from the pilot, comprising whether or not he or she wants to perform a hover flight before vertical descent, and in the case of hover flight before vertical descent, the height ($H_{HOVER}$) with respect to the landing zone, the slope with respect to the horizon ($\theta$), and its heading ($\varphi$).

In one embodiment, the approach parameters supplied by the HMI on instructions from the pilot are determined based on modifiable predefined configurations dependent on charts corresponding to the aircraft model for which it is intended.

According to one embodiment, the computer is configured to implement the fourth step based on cyclical calculations of a deviation between the position of the system and the approach path.

In one embodiment, in the case of hover flight before vertical descent, the computer is configured to calculate the deviation between the position of the system and the approach path in spherical coordinates, centred initially on the hover flight point ($H_{Hover}$), then secondly centred on the landing zone.

According to one embodiment, the HMI is configured to be made available to the pilot on an additional dedicated display device or on a display device already dedicated to the control of the aircraft.

In one embodiment, the system uses, in addition, location data from a GNSS system in order to improve the accuracy of the position of the system.

According to another aspect of the invention, also proposed is a helicopter provided with a system as previously described.

According to another aspect of the invention, also proposed is a drone provided with a system as previously described.

BRIEF DESCRIPTION OF THE DRAWINGS

The invention will be better understood on studying a few embodiments described as nonlimiting examples and illustrated by the attached drawing in which.

DETAILED DESCRIPTION

Figure 1:
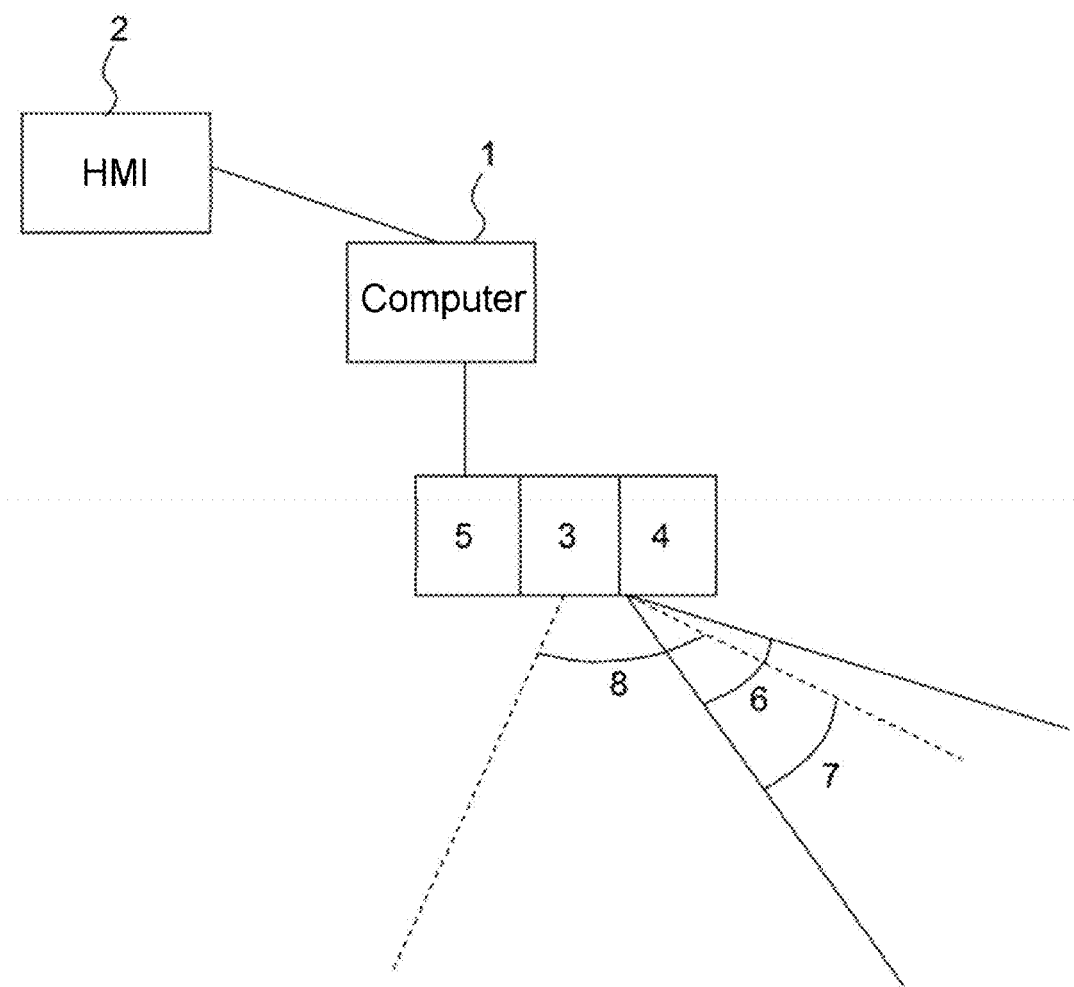
FIG. 1 schematically illustrates a landing zone landing assistance system for a rotary wing aircraft, according to one aspect of the invention.

FIG. 1 schematically illustrates a landing zone landing assistance system for a rotary wing aircraft, according to one aspect of the invention.

The landing zone landing assistance system for a rotary wing aircraft comprises a computer 1, an HMI 2 for interacting with the pilot of the aircraft, an optical assembly 3 provided with at least one optical sensor, a radar assembly 4 provided with at least one radar detector, and an inertial unit 5.

Figure 2:
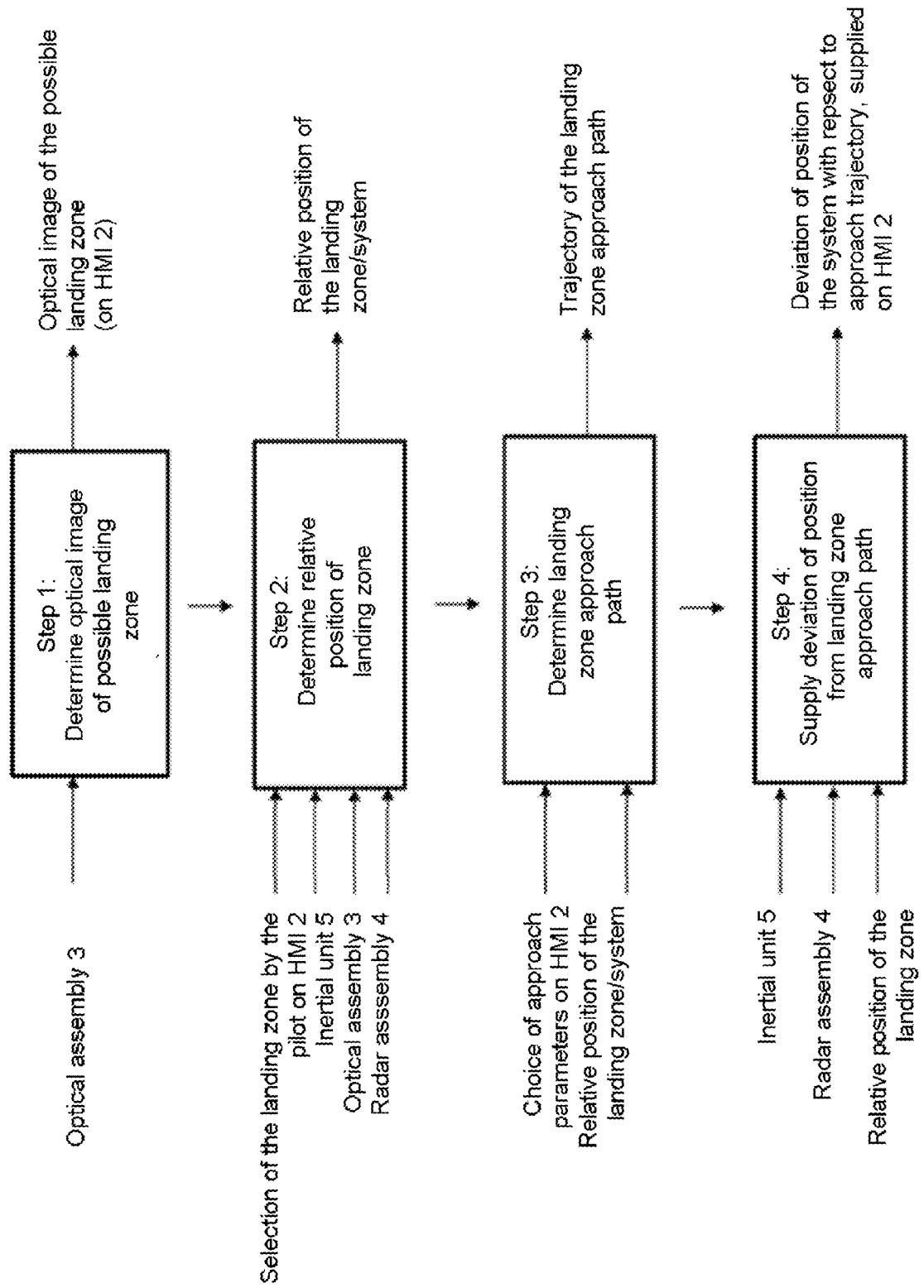
FIG. 2 schematically illustrates the operation of a system of FIG. 1, according to one aspect of the invention.

The computer 1 is configured to implement the steps illustrated by FIG. 2.

The system of the invention comprises a human-machine interface or HMI 2, such as a touch tablet or a display screen of the rotary wing aircraft, on which the pilot of the rotary wing aircraft, such as a helicopter or a drone, displays an optical image of the approaching terrain, for example in infrared.

The optical image is supplied using sensors situated under the aircraft, comprising the optical assembly 3 provided with at least one optical sensor, the radar assembly 4 provided with at least one radar detector. The optical assembly 3 supplies an image of the optical field 6 with a good resolution which allows the pilot to choose the landing zone.

The intersection 7, between the optical field 6 and the radar field 8, constitutes a zone in which range-finding can be applied to the image. To allow the relative positions of the aircraft with respect to the landing zone to be determined in the terrestrial reference frame, it is necessary to also know the attitude of the aircraft (roll, pitch, yaw), in addition to the radar measurement. This information is supplied by the inertial unit 5.

The radar assembly 4 also supplies at least three Doppler speeds making it possible to know the relative position of the aircraft and its flight attitude (for example, as described in the document FR1103890).

By virtue of these elements, the computer 1 is capable of determining, at any moment, the relative position of the aircraft with respect to a landing zone displayed in the field 7, and with respect to a theoretical approach towards this landing zone.

As illustrated in FIG. 2, the computer is configured to implement the following steps:
  a first step Step1 consisting in determining an optical image of the possible landing zone based on the data supplied by the optical assembly 3 representing the intersection 7 of the field 6 of the optical assembly 3 and of the field 8 of the radar assembly 4, and in transmitting this image to the HMI 2 allowing the pilot to select a landing zone, on the possible landing zone reduced to said intersection 7;
  a second step Step2 consisting in determining the relative position of the landing zone with respect to said system in the terrestrial reference frame, based on the landing zone supplied by the HMI 2 selected by the pilot, in the possible landing zone, on data supplied by the inertial unit 5, on data supplied by the optical assembly 3, and on data supplied by the radar assembly 4;
  a third step Step3 consisting in determining a landing zone approach path based on the relative position of the landing zone and on approach parameters supplied by the HMI 2 on instructions from the pilot; and
  a fourth step Step4 consisting in supplying to the HMI 2 a deviation between the position of the system and the approach path, based on data supplied by the inertial unit 5, on data supplied by the radar assembly 4, and on the relative position of the landing zone.

The pilot (or the co-pilot) of the rotary wing aircraft, such as a helicopter or a drone, can display the landing zone through the HMI 2 and using the optical assembly 3 (first step Step1).

The pilot (or the co-pilot) then chooses his or her landing zone by displaying it on the HMI 2 and by selecting it for example with his or her finger using an interface, for example a touch interface. The system determines the relative position of the landing zone with respect to the aircraft (second step Step2) as a function of its input data.

The pilot (or the co-pilot) then chooses his or her type of approach as a function of the MRAD and enters the parameters in the system (third step Step3). The system can then calculate the XYZ position of all the waypoints of the approach trajectory.

The landing phase can then begin. The system determines, cyclically and until the landing zone is reached, the deviation of the aircraft from the approach trajectory. The system reports this information via the HMI 2 to the pilot and/or the co-pilot (fourth step Step4).

The pilot can then manoeuvre the aircraft to restore it to the theoretical approach trajectory. In the case of loss of visibility linked to brownout (dust cloud), the pilot (or the co-pilot) can still identify the deviations using the HMI 2 and correct the trajectory immediately.

Figure 3:
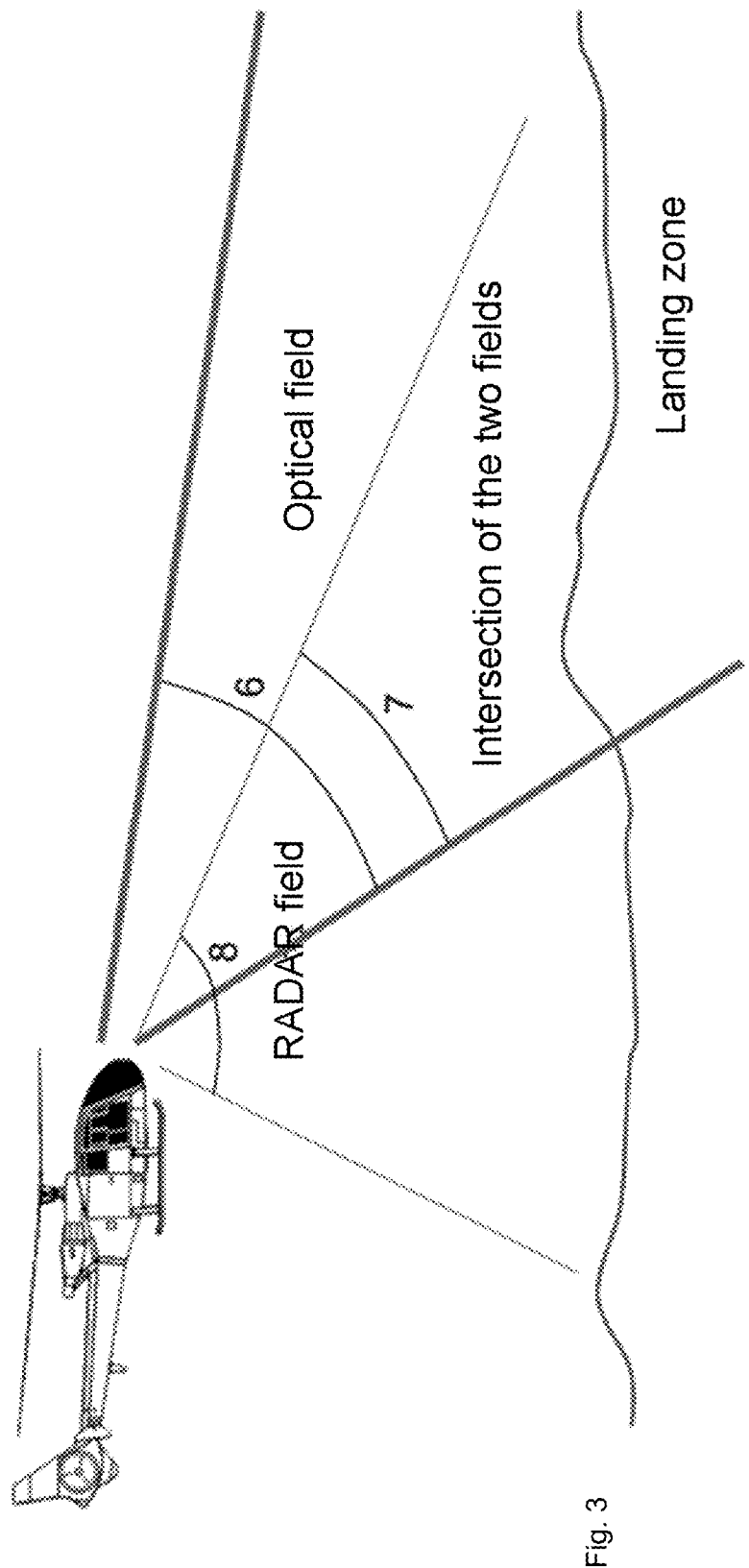
FIG. 3 schematically illustrates the first step implemented by the computer, according to one aspect of the invention.

In the first step Step1, the system, as illustrated in FIG. 3, using its optical assembly 3 and its HMI 2, supplies the pilot with an image of the approaching terrain. If the field 8 of the radar assembly 4 is different from the field 6 of the optical assembly 3, the HMI 2 indicates where the intersection of the two fields, corresponding to a possible landing zone, is situated.

Figure 4:
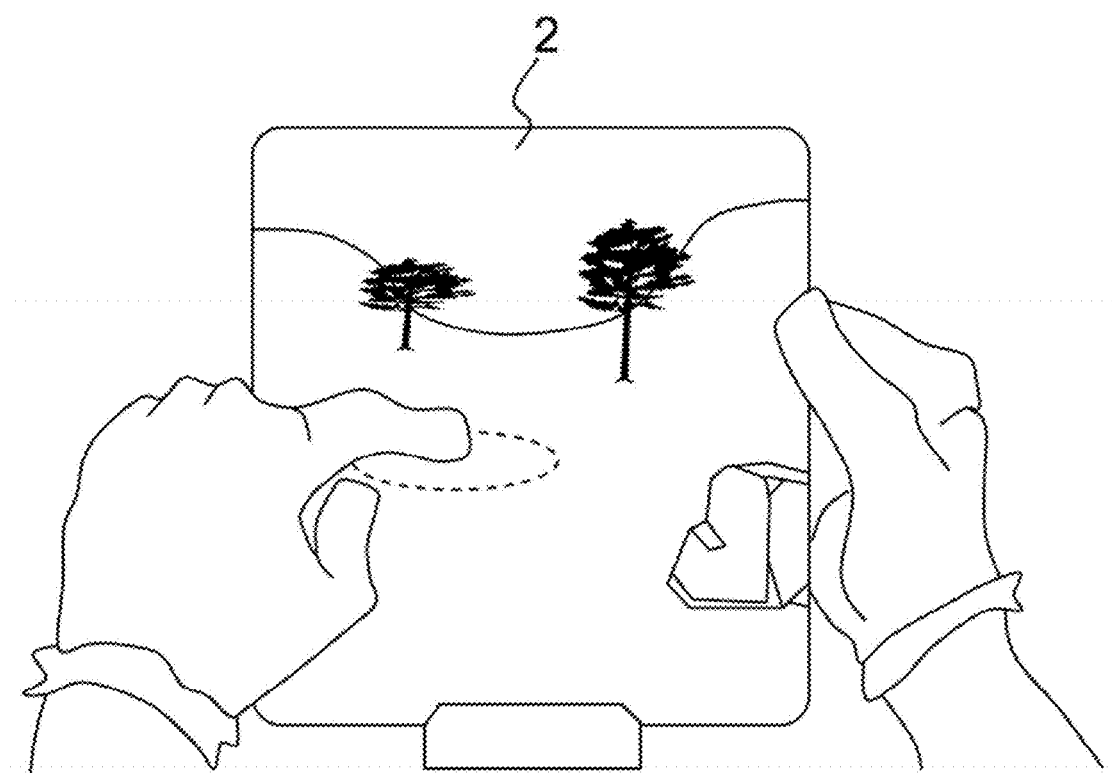
FIG. 4 schematically illustrates the second step implemented by the computer, according to one aspect of the invention.

The pilot (or the co-pilot) can select his or her landing zone, as illustrated in FIG. 4 by means of the HMI 2, in this intersection 7 of the two fields 6 and 8, corresponding to the possible landing zone.

The radar gives the distance, azimuth and elevation of the landing zone (ZA) in the reference frame of the helicopter.

The inertial unit 5 makes it possible to know the attitude (roll, pitch, yaw) of the system, and therefore of the aircraft, with respect to the terrestrial reference frame, and its heading.

Figure 5:
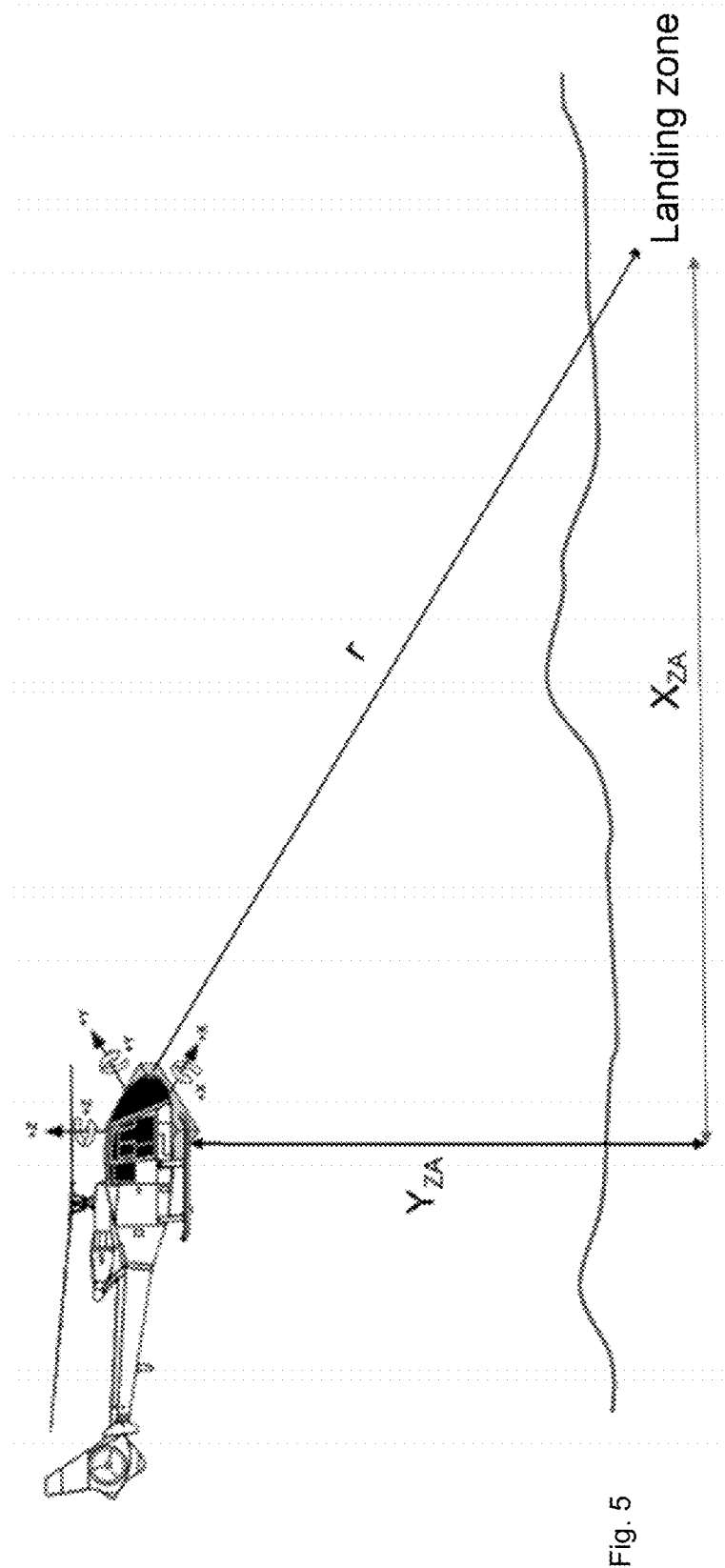
FIG. 5 schematically illustrates the second step implemented by the computer, according to one aspect of the invention.

The computer 1 deduces the relative position ($X_{ZA}$, $Y_{ZA}$, r) of the landing zone with respect to the aircraft in the terrestrial reference frame by calculating the change of reference frame. The calculation of change of reference frame uses the transition matrix determined by the data from the inertial unit 5, as represented in FIG. 5.

Figure 6:
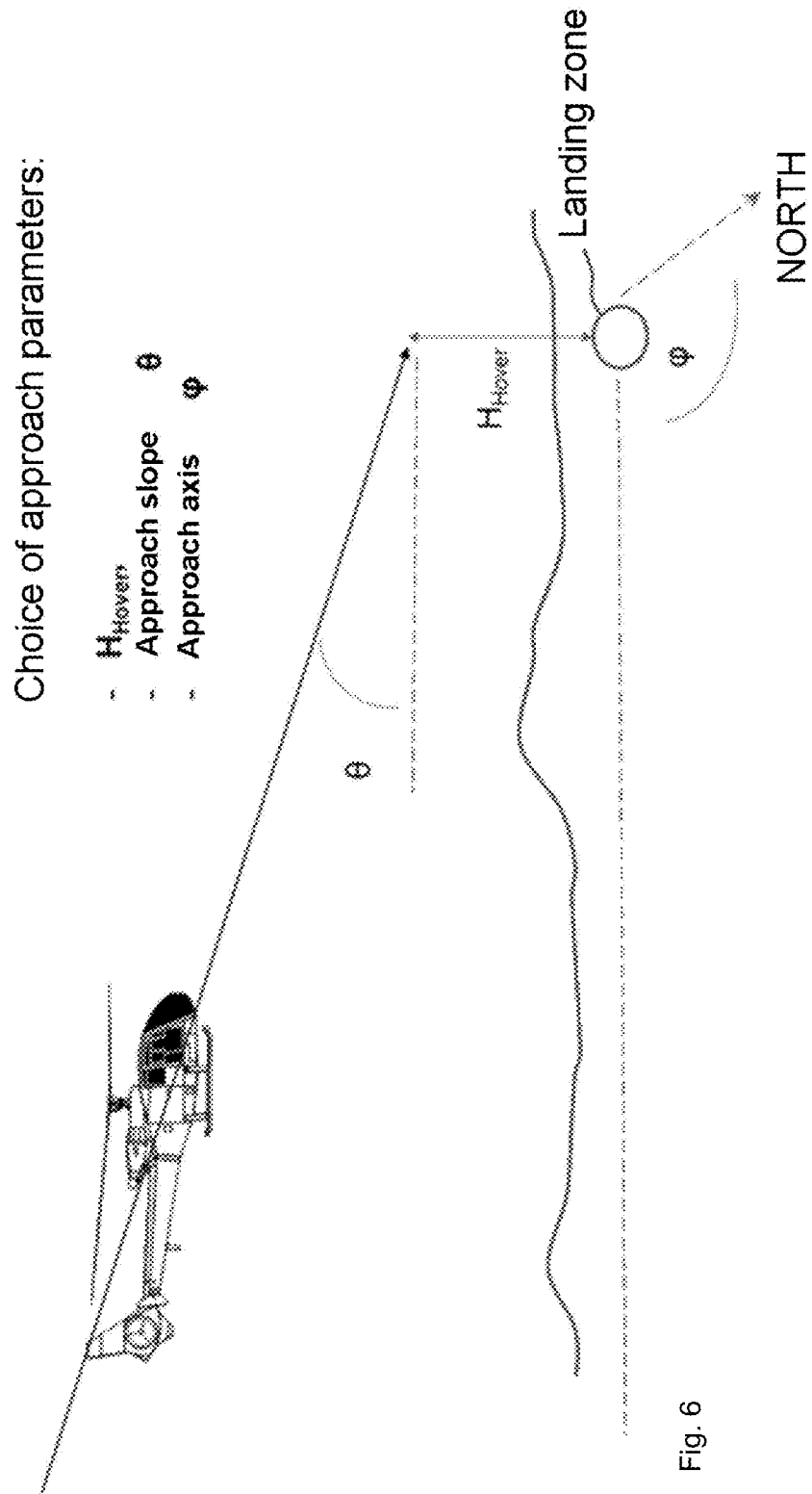
FIG. 6 schematically illustrates the third step implemented by the computer, according to one aspect of the invention.
Figure 7:
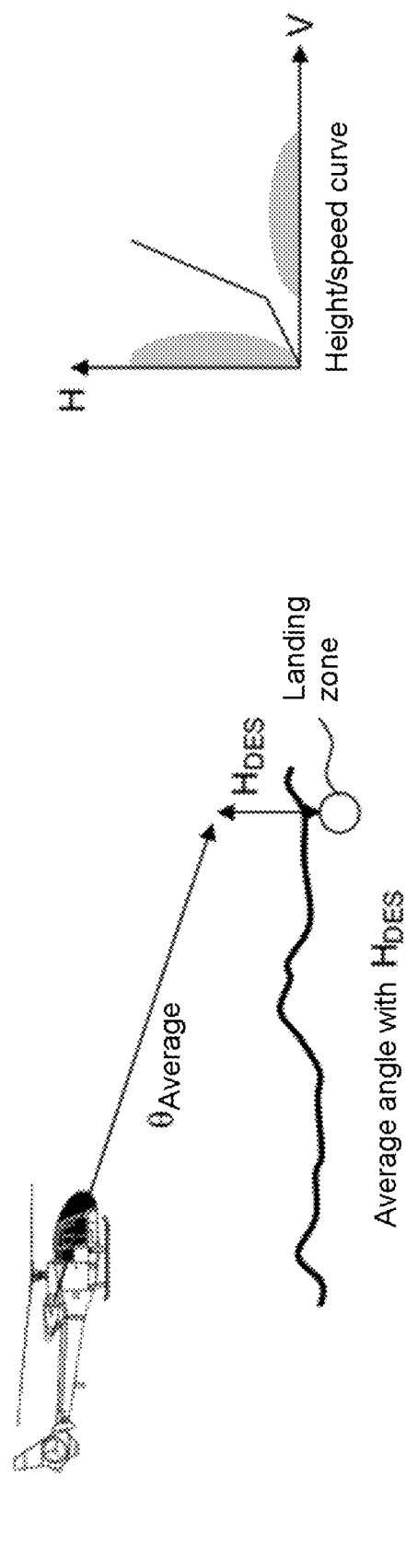
FIG. 7 schematically illustrates the third step implemented by the computer, according to one aspect of the invention.
Figure 8:
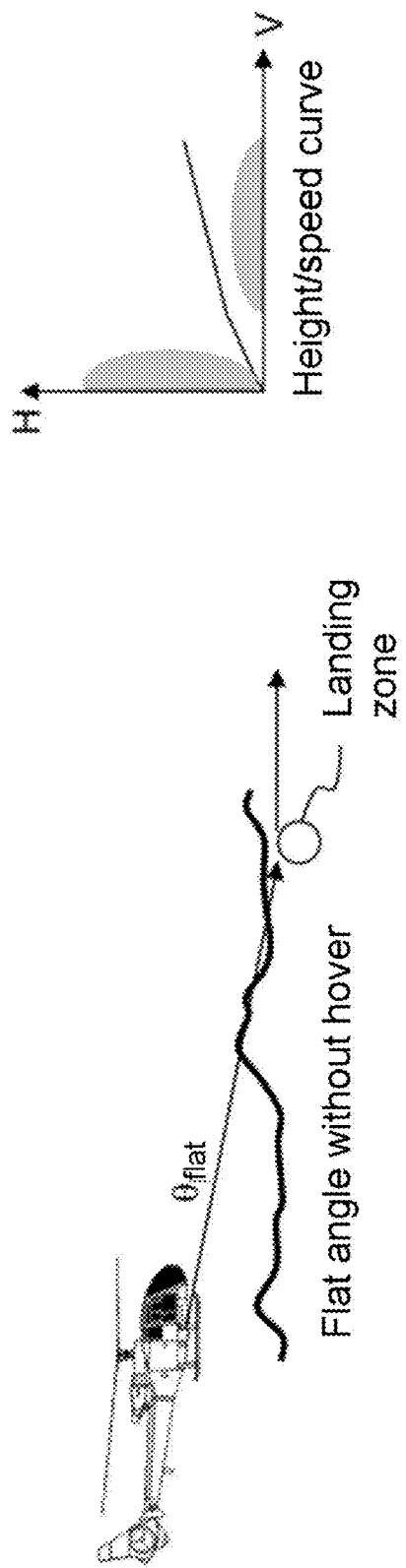
FIG. 8 schematically illustrates the third step implemented by the computer, according to one aspect of the invention.
Figure 9:
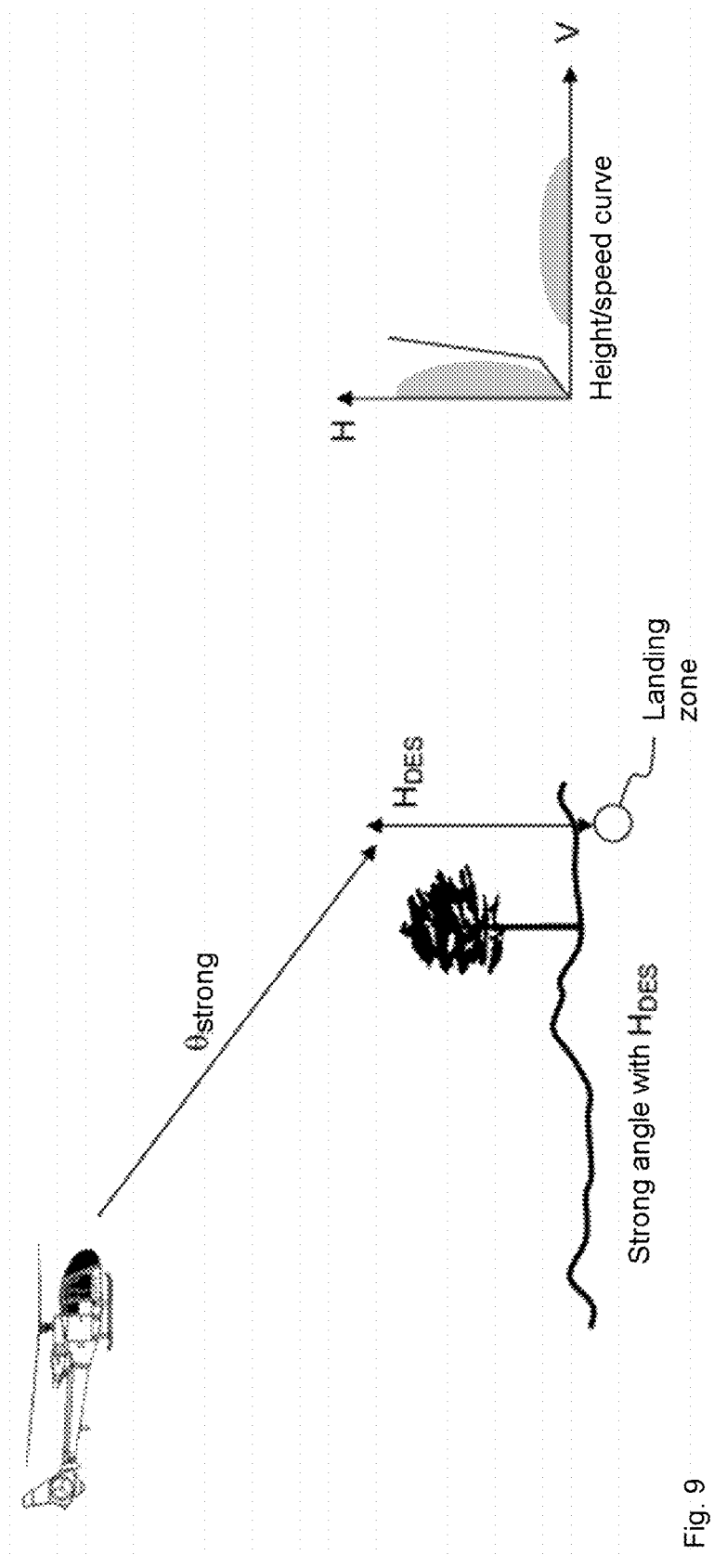
FIG. 9 schematically illustrates the third step implemented by the computer, according to one aspect of the invention.
Figure 10:
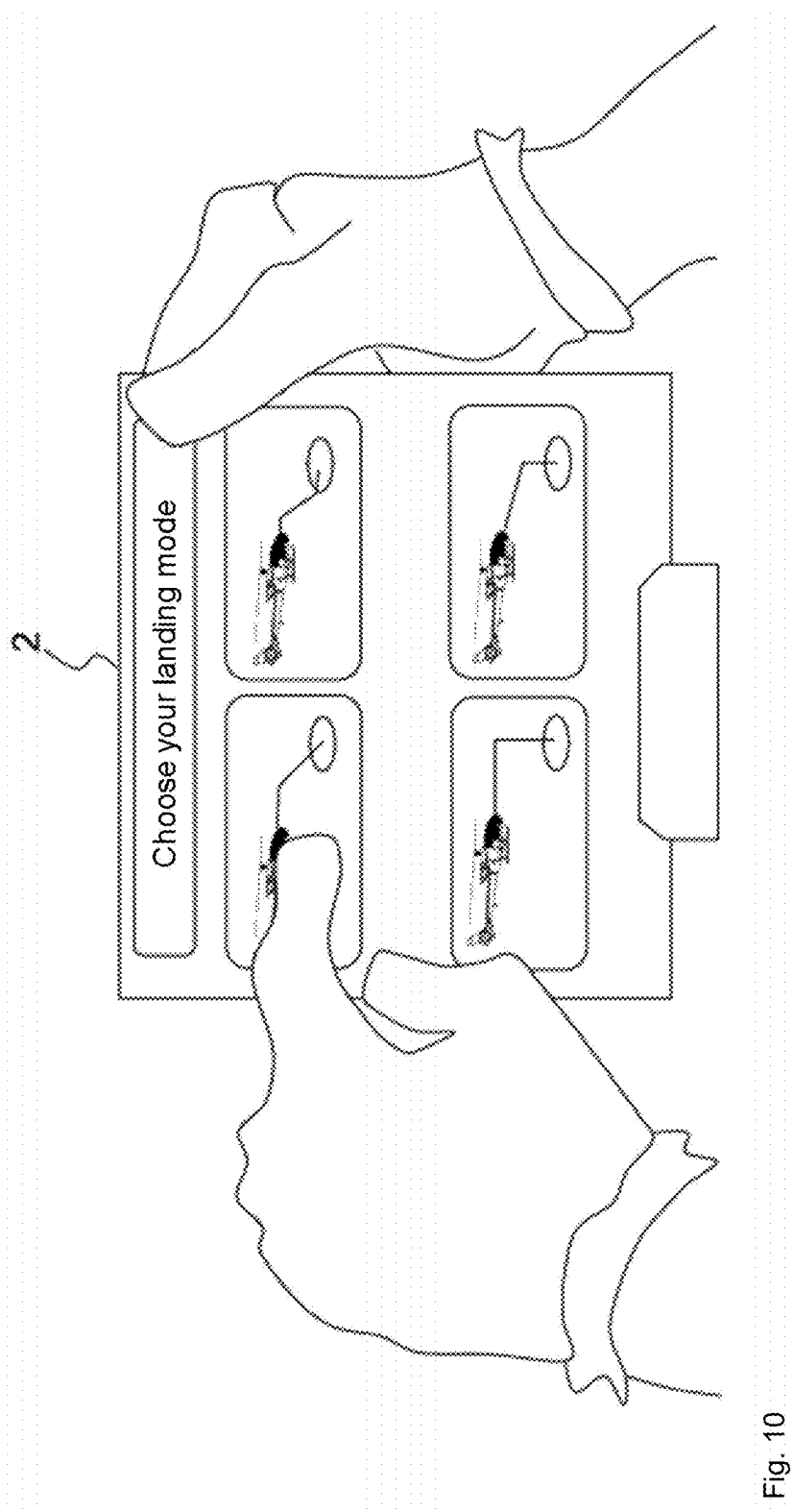
FIG. 10 schematically illustrates the third step implemented by the computer, according to one aspect of the invention.

During the third step Step3, illustrated in FIG. 6, the pilot (or the co-pilot) can then, using the HMI 2, choose his or her approach parameters as a function of the result of the MRAD. Knowing the slope that he or she wants to apply, the axis of his or her approach, whether he or she possibly wants to perform a hover flight before performing a vertical descent, whether this hover flight is performed in ground effect (DES) or out of ground effect (HES), as illustrated in FIG. 7, FIG. 8 and FIG. 9, he or she will be able to enter all these parameters in the HMI 2, as illustrated in FIG. 10:
  height $H_{Hover}$ of possible hover flight with respect to the landing zone;
  slope θ with respect to the horizon;
  axis φ (heading) with respect to North;
  $H_{DES}$ corresponds to a height $H_{Hover}$ below a threshold corresponding to the limit between the presence or not of a ground effect on lift.

In order to allow a more rapid input of the approach parameters, the system can be preconfigured with known charts for certain helicopters or drones (height/speed curves specific to each aircraft). Knowing the slopes formed nominally with respect to these charts (as illustrated in FIG. 7, FIG. 8 and FIG. 9 with different proposed nominal approach profiles), in the different approach types (average angle, strong angle, with or without hover flight before vertical descent, in ground effect, out of ground effect, etc.), the computer 1 is capable of proposing a nominal curve as a function of the choice of type of approach: average angle, strong angle, flat angle, with or without hover, DES or HES.

In this case, as represented in FIG. 10, the pilot selects with the HMI 2 his or her type of approach, for example with the finger on an HMI implemented on a touchscreen and the computer 1 proposes the nominal slope θ and height $H_{Hover}$ dependent on the charts. As for the approach axis, it is given with a default value, for example the heading or the route of the aircraft at the moment of selection of the landing zone. This operation allows certain nominal landing profiles commonly used to be taken into account very rapidly (in one press or a single selection click).

Once the approach parameters are defined and validated by the pilot (or the co-pilot), the landing trajectory is known in space within the terrestrial reference frame centred on the landing zone.

Using the radar and its altitude and speed data, and using the inertial unit 5, the position of the system, and therefore of the aircraft, is calculated cyclically in the terrestrial reference frame centred on the landing zone, for example as described in the document FR1103890.

Figure 11:
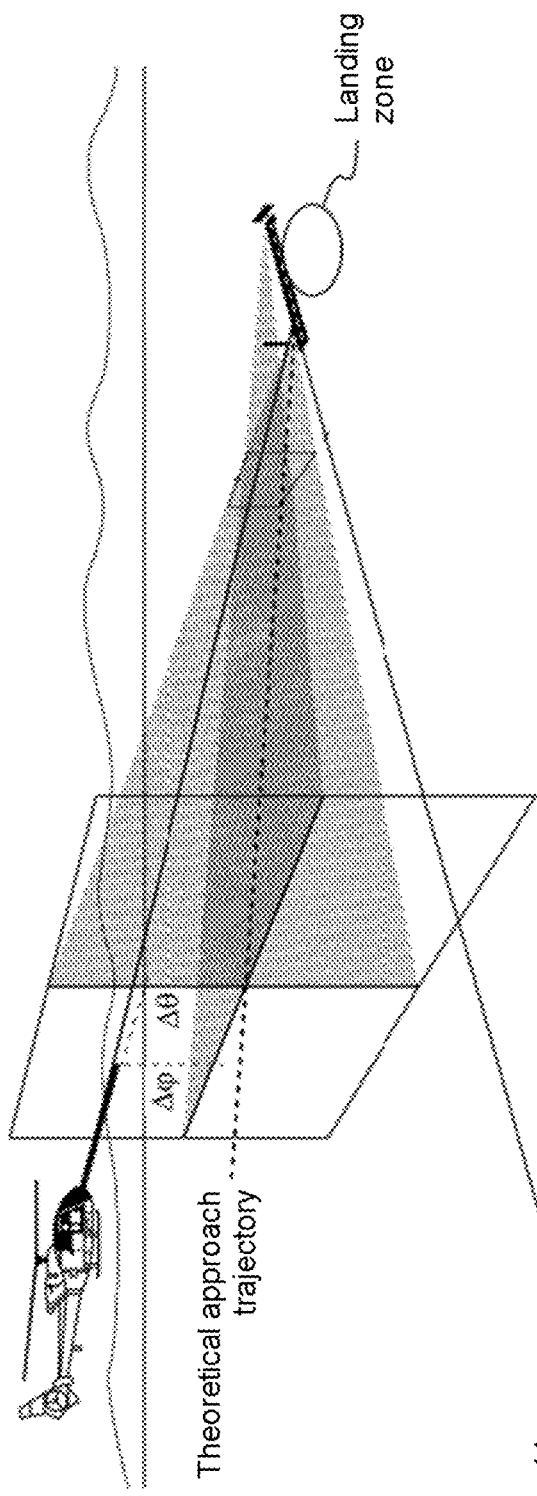
FIG. 11 schematically illustrates the fourth step implemented by the computer, according to one aspect of the invention.

The computer 1 then cyclically calculates the deviations between the theoretical trajectory and the real trajectory of the aircraft, as illustrated in [FIG. 11].

The calculation of the deviation is performed for example in spherical coordinates, centred initially on the hover flight point Hover, then secondly, centred on the landing zone (once a minimum distance has been reached with the Hover point). 4φ represents the deviation with respect to the horizontal axis between the theoretical trajectory and the real trajectory of the aircraft, and 4θ represents the deviation with respect to the vertical axis between the theoretical trajectory and the real trajectory of the aircraft.

This information is supplied to the pilot (or co-pilot) via the HMI 2.

The crossing of alert thresholds of these deviations ($\Delta\varphi_{max}$, $\Delta\theta_{max}$) can also be supplied to the pilot via the HMI 2 to allow him or her to pilot his or her aircraft nominally, i.e. by remaining on the defined theoretical trajectory.

The pilot can thus decide, in the case of loss of visibility (for example linked to the brownout phenomenon), his or her deviations with respect to the approach and the theoretical landing, and thus correct his or her actions.

The invention claimed is:

1. A landing zone landing assistance system for a rotary wing aircraft, the system comprising a computer, an HMI for interacting with the pilot of the aircraft, an optical assembly provided with at least one optical sensor, a radar assembly provided with at least one radar detector, and an inertial unit, wherein the computer is configured to implement the following steps:
   a first step (Step1) comprising determining an optical image of the possible landing zone based on the data supplied by the optical assembly, the possible landing zone representing the intersection of the field of the optical assembly and of the field of the radar assembly, and in transmitting this image to the HMI allowing the pilot to select a landing zone, on the possible landing zone reduced to said intersection;
   a second step (Step2) comprising determining the relative position of the landing zone with respect to said system in the terrestrial reference frame, based on the landing zone supplied by the HMI selected by the pilot, in the possible landing zone, on data supplied by the inertial unit, on data supplied by the optical assembly, and on data supplied by the radar assembly;
   a third step (Step3) comprising determining a landing zone approach path based on the relative position of the landing zone with respect to said system and on approach parameters supplied by the HMI on instructions from the pilot; and
   a fourth step (Step4) comprising supplying to the HMI a deviation between the position of the system and the approach path, based on data supplied by the inertial unit, on data supplied by the radar assembly, and on the relative position of the landing zone.

2. The system according to claim 1, wherein the computer is configured to implement the second step (Step2) based on:
   data supplied by the radar assembly, comprising the distance, the azimuth and the elevation of the selected landing zone in the reference frame of the system;
   data supplied by the inertial unit comprising the roll, yaw and pitch angles of the system defining the attitude of the system and its heading with respect to the terrestrial reference frame;
   and configured to determine the relative position of the landing zone with respect to said system in the terrestrial reference frame by using a transition matrix determined on the basis of data supplied by the inertial unit.

3. The system according to claim 1, wherein the computer is configured to implement the third step (Step3) based on:
   the relative position of the landing zone with respect to said system in the terrestrial reference frame; and
   approach parameters supplied by the HMI on instructions from the pilot, comprising whether or not he or she wants to perform a hover flight before vertical descent, and, in the case of hover flight before vertical descent, the height ($H_{HOVER}$) with respect to the landing zone, the slope (θ) with respect to the horizon, and its heading (φ).

4. The system according to claim 1, wherein the approach parameters supplied by the HMI on instructions from the pilot, are determined on the basis of modifiable predefined configurations dependent on charts corresponding to the model of the aircraft for which it is intended.

5. The system according to claim 1, wherein the computer is configured to implement the fourth step (Step4) based on cyclical calculations of a deviation between the position of the system and the approach path.

6. The system according to claim 5, wherein, in case of hover flight before vertical descent, the computer is configured to calculate the deviation between the position of the system and the approach path in spherical coordinates, centered initially on the hover flight point ($H_{HOVER}$), then, secondly, centered on the landing zone.

7. The system according to claim 1, wherein the HMI is configured to be made available to the pilot on an additional dedicated display device or a display device already dedicated to the control of the aircraft.

8. The system according to claim 1, using, in addition, location data from a GNSS system in order to enhance the accuracy of the position of the system.

9. A helicopter provided with a landing zone landing assistance system for a rotary wing aircraft, the system comprising a computer, an HMI for interacting with the pilot of the aircraft, an optical assembly provided with at least one optical sensor, a radar assembly provided with at least one radar detector, and an inertial unit, wherein the computer is configured to implement the following steps:
   a first step (Step1) comprising determining an optical image of the possible landing zone based on the data supplied by the optical assembly, the possible landing zone representing the intersection of the field of the optical assembly and of the field of the radar assembly, and in transmitting this image to the HMI allowing the pilot to select a landing zone, on the possible landing zone reduced to said intersection;
   a second step (Step2) comprising determining the relative position of the landing zone with respect to said system in the terrestrial reference frame, based on the landing zone supplied by the HMI selected by the pilot, in the possible landing zone, on data supplied by the inertial unit, on data supplied by the optical assembly, and on data supplied by the radar assembly:

a third step (Step3) comprising determining a landing zone approach path based on the relative position of the landing zone with respect to said system and on approach parameters supplied by the HMI on instructions from the pilot; and a fourth step (Step4) comprising supplying to the HMI a deviation between the position of the system and the approach path, based on data supplied by the inertial unit, on data supplied by the radar assembly, and on the relative position of the landing zone.

10. A drone provided with a landing zone landing assistance system for a rotary wing aircraft, the system comprising a computer, an HMI for interacting with the pilot of the aircraft, an optical assembly provided with at least one optical sensor, a radar assembly provided with at least one radar detector, and an inertial unit, wherein the computer is configured to implement the following steps:

a first step (Step1) comprising determining an optical image of the possible landing zone based on the data supplied by the optical assembly, the possible landing zone representing the intersection of the field of the optical assembly and of the field of the radar assembly, and in transmitting this image to the HMI allowing the pilot to select a landing zone, on the possible landing zone reduced to said intersection;

a second step (Step2) comprising determining the relative position of the landing zone with respect to said system in the terrestrial reference frame, based on the landing zone supplied by the HMI selected by the pilot, in the possible landing zone, on data supplied by the inertial unit, on data supplied by the optical assembly, and on data supplied by the radar assembly:

a third step (Step3) comprising determining a landing zone approach path based on the relative position of the landing zone with respect to said system and on approach parameters supplied by the HMI on instructions from the pilot; and a fourth step (Step4) comprising supplying to the HMI a deviation between the position of the system and the approach path, based on data supplied by the inertial unit, on data supplied by the radar assembly, and on the relative position of the landing zone.

* * * * *